United States Patent [19]

Bluethman

[11] 4,084,258
[45] Apr. 11, 1978

[54] APPARATUS FOR PERFORMING MULTIPLE OPERATIONS IN A SHIFT REGISTER MEMORY

[75] Inventor: Robert Glenn Bluethman, Austin, Tex.

[73] Assignee: International Business Machines Corporation, Armonk, N.Y.

[21] Appl. No.: 463,028

[22] Filed: Apr. 22, 1974

Related U.S. Application Data

[63] Continuation-in-part of Ser. No. 214,369, Dec. 30, 1971, abandoned.

[51] Int. Cl.$^2$ .................. G06F 7/00; G06F 13/00
[52] U.S. Cl. .................................................. 364/900
[58] Field of Search ............. 340/172.5; 364/200 MS, 364/900 MS

[56] References Cited

U.S. PATENT DOCUMENTS

| | | | |
|---|---|---|---|
| 2,907,009 | 9/1959 | Lesser | 340/172.5 |
| 3,122,726 | 2/1964 | King, Jr. et al. | 340/172.5 |
| 3,239,764 | 3/1966 | Verma et al. | 340/172.5 |
| 3,274,566 | 9/1966 | McGrogan, Jr. | 340/172.5 |
| 3,291,910 | 12/1966 | Nicklas et al. | 340/172.5 |
| 3,350,692 | 10/1967 | Cagle et al. | 340/172.5 |
| 3,411,142 | 11/1968 | Lee et al. | 340/172.5 |
| 3,501,746 | 3/1970 | Vosbury | 340/172.5 |
| 3,517,391 | 6/1970 | Lente | 340/172.5 |
| 3,525,081 | 8/1970 | Flemming, Jr. et al | 340/172.5 |
| 3,675,216 | 7/1972 | James | 340/172.5 |

*Primary Examiner*—Mark E. Nusbaum
*Attorney, Agent, or Firm*—James H. Barksdale, Jr.

[57] ABSTRACT

An apparatus for performing multiple operations during a memory revolution in an electronic dynamic shift register. The memory is initially arranged by the input of control codes such as record, operation, separator, and hold flags. The separator flag defines a normal section and an alternate section, and the operation and hold flags define the position of the next character to be addressed in each of the sections. The record flag is the operating point for an output operation in the normal section. When one of the sections is addressed and it does not contain the operation flag, the hold and operation flags are exchanged in order that the operation flag is in the section addressed. With the operation flag in the normal section, an input zone is defined by the separator flag in the alternate section, and a revision zone is defined from the record flag to the separator flag in the normal section. When the operation flag is in the alternate section, the input zone begins with the first dummy code following the operation flag, and the revision zone is from the separator flag to the first dummy code. An output zone is defined in the normal section by inserting a page end code and extends from the record flag through the page end code. When the page end code is inserted, the revision zone is redefined from the page end code to the separator flag. This arrangement of memory allows for multiple operations such as input, output, and revision to be performed during any one memory revolution. Upon decode of the control codes defining the sections and zones, initiated operations are performed and controlled.

6 Claims, 28 Drawing Figures

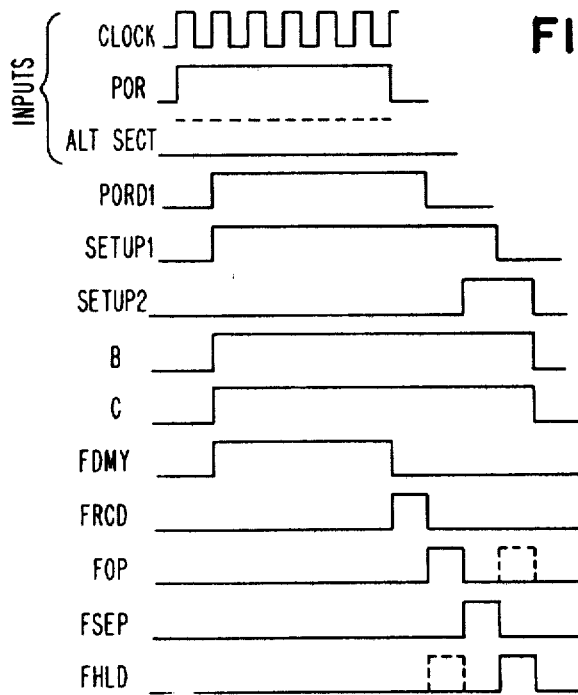
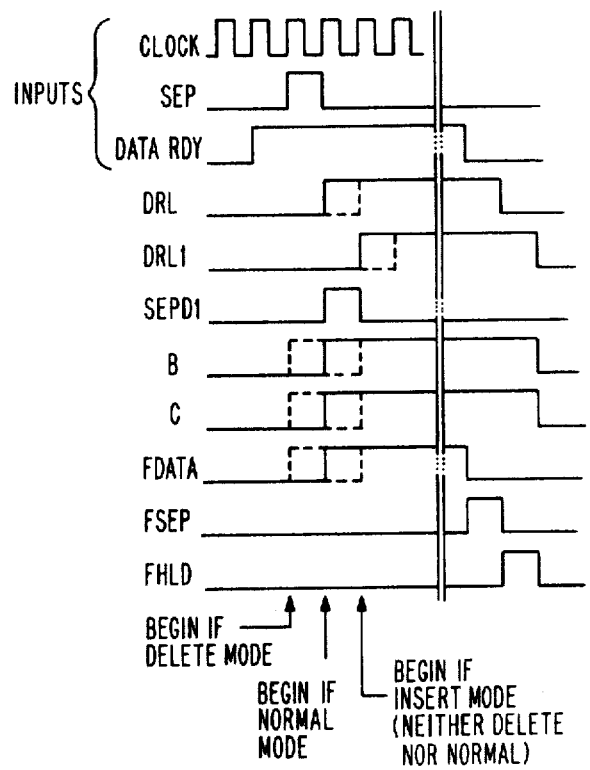
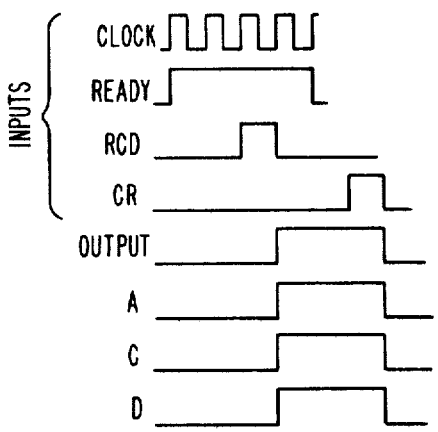

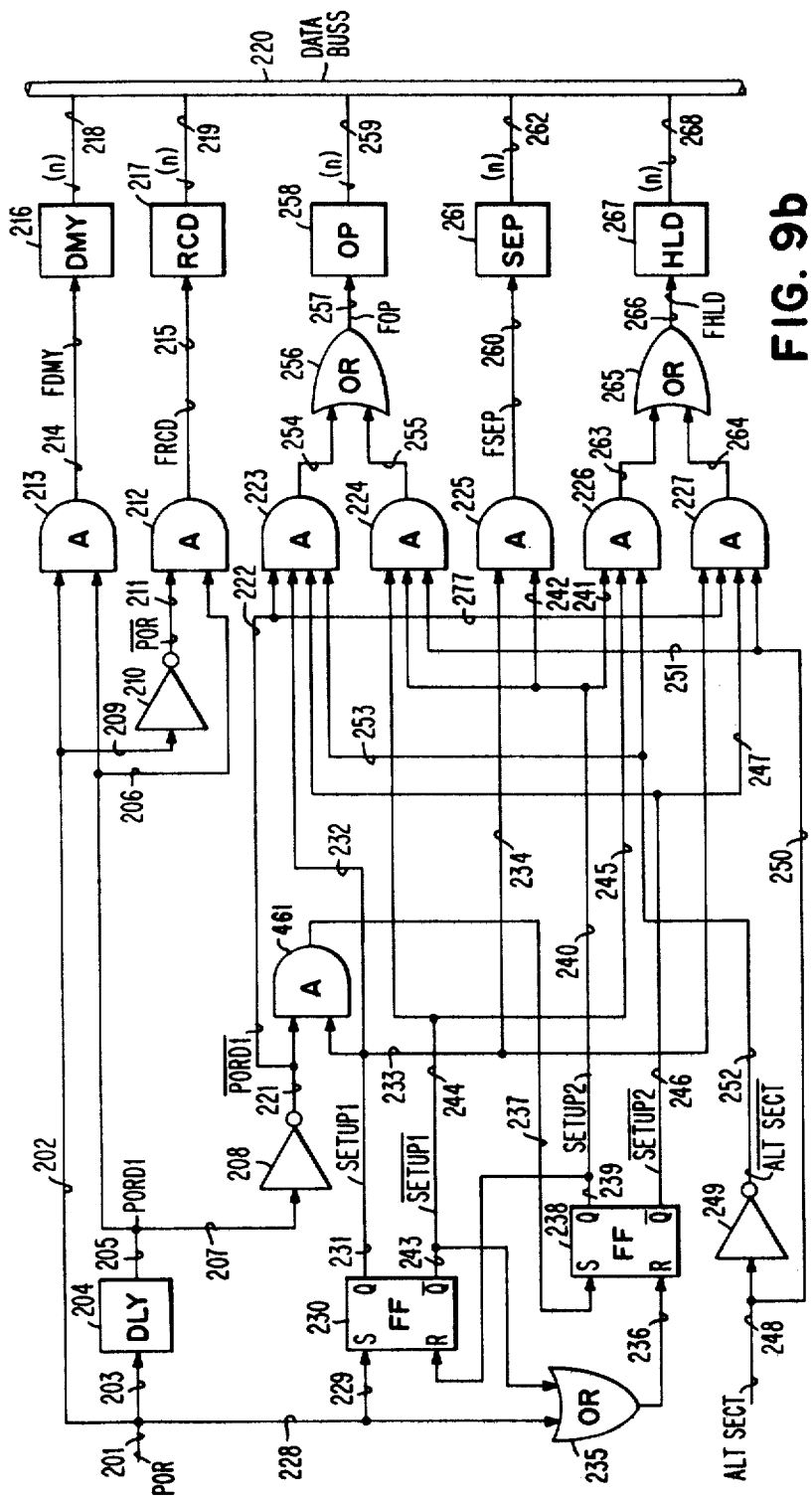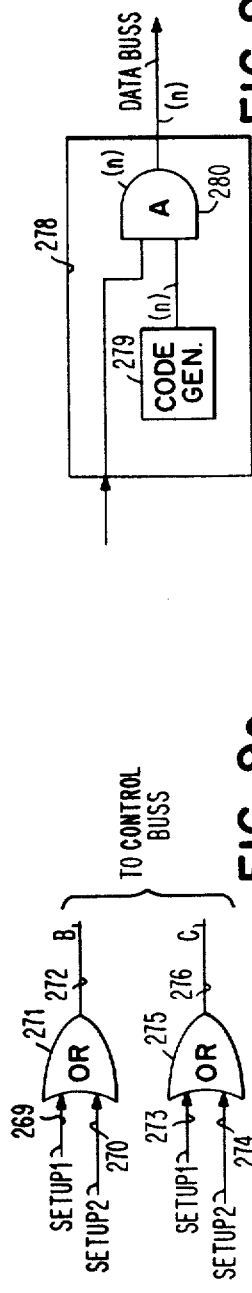

APPARATUS FOR PERFORMING MULTIPLE OPERATIONS IN A SHIFT REGISTER MEMORY

CROSS-REFERENCES TO RELATED APPLICATIONS

This application is a continuation-in-part of copending application Ser. No. 214,369, filed Dec. 30, 1971, entitled "Method of Performing Multiple Operations", now abandoned.

The following are other related applications.

U.S. patent application Ser. No. 439,785, now abandoned, filed Feb. 5, 1974, entitled "System for Merging Data Flow", having R. G. Bluethman et al. as inventors, which is a continuation-in-part of application Ser. No. 194,418, now abandoned, filed Nov. 1, 1971, entitled "System for Merging Data Flow", having R. G. Bluethman et al. as inventors, now abandoned.

U.S. patent application Ser. No. 463,029, filed Apr. 22, 1974, entitled "System for Arranging and Sharing Shift Register Memory", having R. D. Lindsey et al. as inventors, which is a continuation-in-part of application Ser. No. 214,370, now abandoned, filed Dec. 30, 1971, entitled "Method of Arranging and Sharing Shift Register Memory", having R. D. Lindsey et al. as inventors, now abandoned.

BACKGROUND OF THE INVENTION

1. Field of the Invention

This invention relates to printing and editing systems in general, and more specifically to a method for arranging the memory in an electronic dynamic shift register for performing multiple operations. The shift register memory is arranged with control codes such that input, output, and revision operations can occur during each memory revolution. System control logic is provided which recognizes the control codes and controls the input, output, and revision operations.

2. Description of the Prior Art

The prior art devices include the Magnetic Tape "Selectric"* Typewriter. One of the problems encountered when utilizing a single tape Magnetic Tape "Selectric"* Typewriter is that when a revision is to be made, the revision cannot be more extensive than the original recording or the previously recorded material will be overrun. This problem was alleviated on the MT/ST by providing a second tape and transferring the contents of the original tape to the second tape along with revisions (insertions and deletions) performed during the transfer.

*Trademark, International Business Machines Corporation

However, the problem of blank blocks on the tape is still present. Also, during scanning, encountering blank positions requires time for reading or special logic to skip these blank positions. The present invention improves on the MT/ST system in that due to the structure of the dynamic shift register, the data is packed so that no blank spaces in text are present. Further, the sections in the buffer are expandable; allowing for input and deletion while maintaining a packed memory. In addition, the memory cycle is very short, and therefore, the data in the buffer can be readily scanned and a correction of improperly recorded material is easily handled.

Another problem which is stil present is the inability to perform overlapped operations. It has not been possible to perform combinations of input, output, and revision operations simultaneously during a memory revolution. This is because of tape handling and addressing problems inherent in a tape system. That is, only that part of the tape being used is subject to any given operation at any one time. For another operation to occur, the operation must be interrupted and another part of the tape addressed.

SUMMARY OF THE INVENTION

A buffer, which is a dynamic shift register, controlled by system control logic is in electronic association with a bulk store and an input/output typewriter. The shift register memory is arranged such that multiple operations can be performed during each memory revolution.

At the beginning of operation, the shift register is loaded with dummy codes. Control codes such as record, operation, separator, and hold flags are then input into the shift register and written over dummy codes. The input of a separator flag defines a normal section and an alternate section in the shift register. The hold and operation flags are the addresses of the next character for various operations in each of the sections, and the record flag is the operating point for an output operation in the normal section. When one of the sections is addressed by an operator and that section does not contain the operation flag, the hold and operation flags are exchanged. This exchange is for purposes of having the operation flag in the section addressed.

With the normal section addressed and the operation flag in the normal section, the data flow could be —(-DUMMY) (RECORD) (x) (x) (PAGE END) (OPERATION) (x) (SEPARATOR) (HOLD) (DUMMY)—. Here an input zone is defined by the separator and hold flags in the alternate section, and a revision zone is defined from the record flag to the separator flag in the normal section.

With the alternate section addressed and the operation flag in the alternate section, the data flow could be —(DUMMY) (RECORD) (x) (x) (PAGE END) (HOLD) (x) (SEPARATOR) (x) (OPERATION) (x) (x) (DUMMY)—. In this case, the input zone begins with the first dummy code following the operation flag, and the revision zone is from the separator flag to the first dummy code.

Regardless of the section addressed, after a page end code has been inserted and exists in memory between the record and operation or hold flags, an output zone is defined. That is, in the normal section an output zone is defined which extends from the record flag through the page end code.

Upon detection of those control codes defining an input zone, text data codes such as characters and spaces denoted by (x) can be transferred from a bulk store into the shift register. At the end of the transfer operation, the data codes input are in the revision zone. The input/output typewriter included in the system is used for performing revision operations in the revision zone. Upon detection of those control codes defining an output zone, data codes can be transferred from the shift register to a bulk store.

With the above arrangement, input, output, and revision operations can be performed during each memory revolution as the control codes are detected in the data and control code flow.

BRIEF DESCRIPTION OF THE DRAWING

FIGS. 9a, 10a, 11a, 12a, 13a, and 14a are timing diagrams illustrating the sequence of operation of the logical elements of FIGS. 9b and 9c, 10b, 11b, 12b, 13b and 14b;

FIGS. 9b and 9c, 10b, 11b, 12b, 13b and 14b are detailed logic diagrams of a preferred embodiment of the operations described by the flow charts in FIGS. 9, 10, 11, 12, 13 and 14, respectively. and FIG. 9d shows a logical implementation of a code generator that may be utilized for the code generators in FIGS. 9b, 10b, and 12b.

DESCRIPTION OF THE PREFERRED EMBODIMENT

Figure 1:
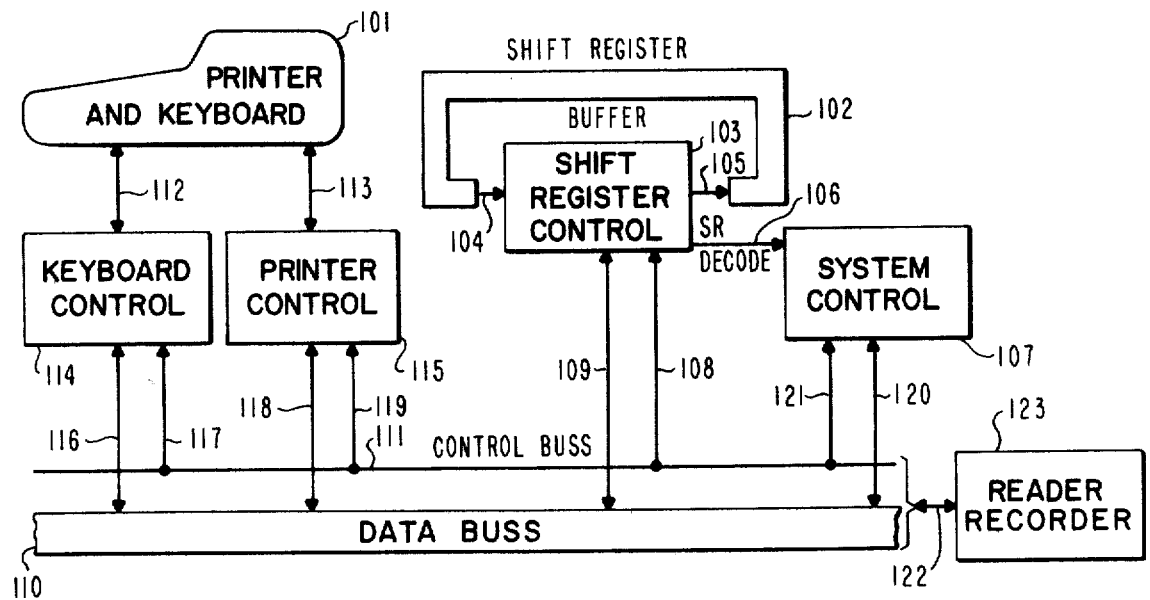
FIG. 1 is an overall block diagram illustrating the various control circuits utilized along with a typewriter buffer.

For a more detailed description of the invention, reference is first made to FIG. 1 wherein there is shown an input/output typewriter 101 in communication with a buffer 102 through controls 114 and 115. Buffer 102 is an electronic dynamic shift register and is controlled by the control logic, or shift register control 103. Control 103 receives the output from the output stage of buffer 102 along line 104 and provides an input to the input stage of buffer 102 along line 105.

The typewriter 101 is in two-way communication with the keyboard control unit 114 along line 112 and with printer control unit 115 along line 113. Keyboard control 114 and printer control 115 are also in two-way communication with the data buss 110 along line 116 and 118, respectively. Data buss 110 is also in two-way communication with the shift register control 103 along line 109 and the system control logic 107 along line 120. The data buss 110 can communicate, as indicated by arrows 122, with a bulk store, such as reader/recorder 123. The control buss 111 is in two-way communication with keyboard control unit 114 along line 117, printer control unit 115 along line 119, shift register control logic 103 along line 108, and system control logic 107 along line 121. System control logic 107 receives decoded data from shift register control 103 along line 106.

In the following description, the terms reader/recorder and bulk store are meant to include recording media such as tapes, cards, discs, etc., and the associated structure for reading, writing and erasing data onto and from the recording media.

Broadly, reference to input operations is to be taken as a write-over operation where, for example, text data codes are written over dummy codes. This operation also includes the transfer of data codes from a bulk store into the shift register. Insert operations include the insertion of data codes and control codes into the data flow, and delete operations include writing over data codes with delete codes. For insert operations the data flow is essentially expanded for inclusion of a data or control code. Output operations include the reading of data codes in the shift register memory and the writing of these data codes into a bulk store. This operation will also be referred to as the transfer of data codes from the shift register to the bulk store. More specifically, input and output in terms of zones and of operations to be performed are related to external devices such as a reader recorder. That is, a block of data is input into the shift register memory into the input zone from a reader recorder. Likewise, a block of data is output from the output zone of the shift register memory to a reader recorder. Operations related to the revision zone involve the use of an I/O typewriter or printer in terms of playout or input keying.

Examples of overlapped or multiple operations which can occur during a single memory revolution are:

(1) Data can be read from a card and stored in the shift register memory. After some data has been stored, playout by the printer from memory can begin while the remainder of the data on the card is being read and stored in memory. In this case, printer playout can begin almost immediately without an operator having to wait for the entire card to be read and stored.

(2) If in (1) above an operator detects an error during reading and playout, a revision operation can be performed during the continued reading and storing of card data.

(3) During an input keying operation, an operator can record a page end code, initiate an output operation for writing the keyed and stored page on a card, and commence keying the next page. Again, no delay in terms of waiting for data to be recorded on a card before starting the next operation is involved.

Figure 2:
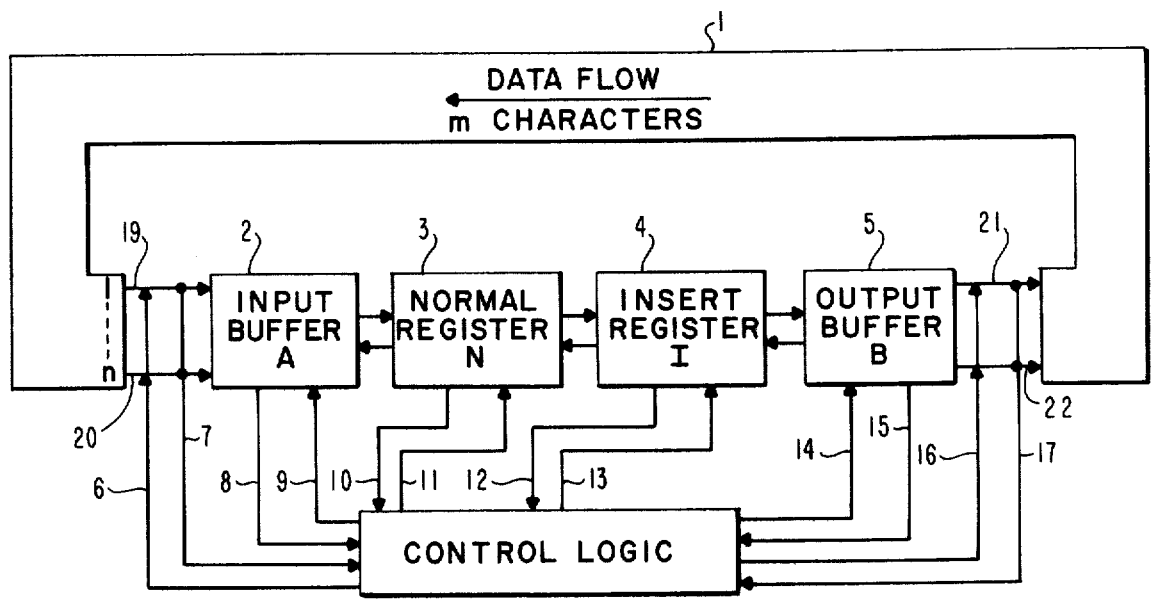
FIG. 2 is a generalized block diagram showing a shift register with certain buffers connected between its input and output stages which are controlled by a control unit to accomplish alteration of the data paths for timewise shifting of the data for insertion or deletion of characters, flags, and codes.

Reference is now made to FIG. 2 wherein there is shown a generalized block diagram of a system being part of the above system and employing four registers between the input and output stages of a shift register. As shown, the shift register 1 is of $m$ characters in length and each character may be $n$ bits in width. The data as depicted moves in a counter-clockwise direction, and comes out of the final stage on lines 19 and 20 and is applied to an input buffer 2. This buffer, during the subsequent description of data flow, to simplify the description, is labeled A. Buffers and registers subsequently to be described are also designated with briefing characters N, I, and B. The output from the shift register is also applied along line 7 to control logic unit and as shown the control logic unit can also apply data along line 6 to lines 19 and 20. In the subsequent description, while lines such as 6 and 7 are shown as single lines, it should be understood that there are actually as many lines as each character is wide. Input buffer 2 is also connected to normal register 3 and as shown can both provide data to normal register 3 and accept data from register 3 which is designated the N buffer. The input buffer 2 is also in two-way communication with the control logic along lines 8 and 9 and as shown normal register 3 is likewise in two-way communication with the control logic along lines 10 and 11. Further, as shown the normal register is in two-way communication with insert register 4 which likewise is in two-way communication along lines 12 and 13 with the control logic. Finally, insert register 4 is in two-way communication with output buffer 5 which is also in two-way communication along lines 14 and 15 with the control logic. Again, as shown the control logic is in two-way communication with lines 21 and 22 along lines 16 and 17 which connect the input stage of the buffer to the control logic.

With this generalized block diagram, data flow is under the control of the control logic. The control logic as illustrated (1) takes the data from the output stage of the shift register and channels it into the appropriate register A, N, I, or B to control timewise shifting, (2) applies data to the input stage of the register along lines 21 and 22, (3) takes data from the output of any register, or (4) causes data to be applied to any shift register to accomplish any of the required functions associated with the task to be performed. The generalized flow of FIG. 2 is shown merely to illustrate that the control logic accepts data from the various lines and buffers and channels the data to the appropriate register to cause insertion, deletion, etc., of characters.

Figure 3:
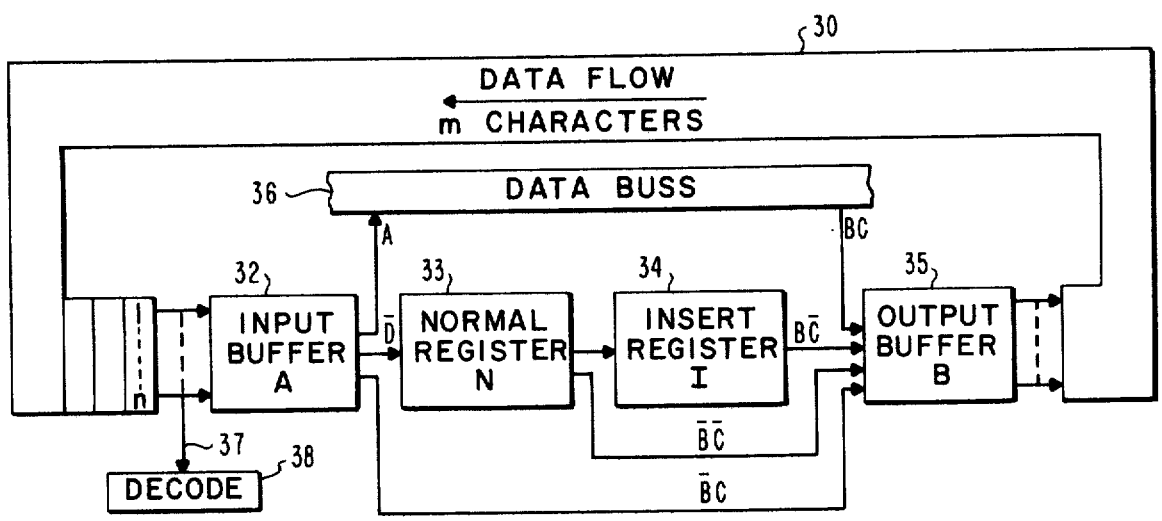
FIG. 3 is another block diagram illustrating a preferred embodiment of the subject novel shift register and control technique.

In FIG. 3 is shown a preferred embodiment of a system generally in accordance with the diagram of FIG. 2. The embodiment of FIG. 3 is much more efficient than the system of FIG. 2 in that the system of FIG. 3 does not directly control the data flow by bringing the characters into the control logic. Instead by selective actuation of four logical lines the embodiment in FIG. 3 can cause the completion of editorial tasks such as insertion of characters, deletion of characters, error correct backspace, and other functions normally found in revision systems.

As shown in FIG. 3, a shift register 30 has a data flow in the counter-clockwise direction such that the output of the shift register is applied to an input buffer 32 again labeled A. The output from the shift register is also applied along line 37 to a decode unit 38 which decodes the characters and provides an indication to the control logic, not shown, as to which characters are at the output of the shift register. The output from the input buffer A can be applied under logical control to line $\bar{B}C$ which causes the data to flow from input buffer A to an output buffer 35. Additionally, data from the input buffer 32 may be applied along line $\bar{D}$ to normal register 33.

Input buffer 32 is also, as shown, connected along line A to a data buss 36. Data buss 36 in turn is connected along line BC to the output buffer 35. The data buss is shown in general form and its specific configuration will depend upon the type of apparatus connected to the shift register. That is, the data buss may in effect be the character output register and the input register of a typewriter. The normal register 33 is as shown connected along line $\bar{B}\bar{C}$ to the output buffer 35 and is also connected to the insert register 34. The insert register 34 is also connected along line $B\bar{C}$ to the output buffer 35. These various lines such as $\bar{B}\bar{C}$ are labeled in accordance with the logical control signals which must be applied to control the flow of the data along the designed path. These notations are in accordance with those used in the detailed schematic of FIG. 5.

Figure 4:
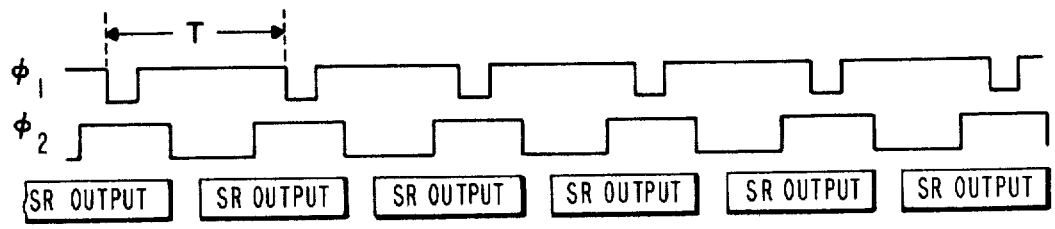
FIG. 4 is a timing diagram illustrating the timing of the two phase clock employed which causes data to shift and be set in the register along with an illustration of the time of valid shift register output.

FIG. 4 shows the basic timing employed in the shift register system. Shown is the output of a two phase clock $\phi_1$ and $\phi_2$; T illustrates the cycle time. The falling edge of $\phi_1$ is used to set data into the various buffers while the falling edge of $\phi_2$ defines the output of data from the shift register. As shown the shift register output is not available for a short time following the falling edge of the $\phi_2$ clock.

Figure 5:
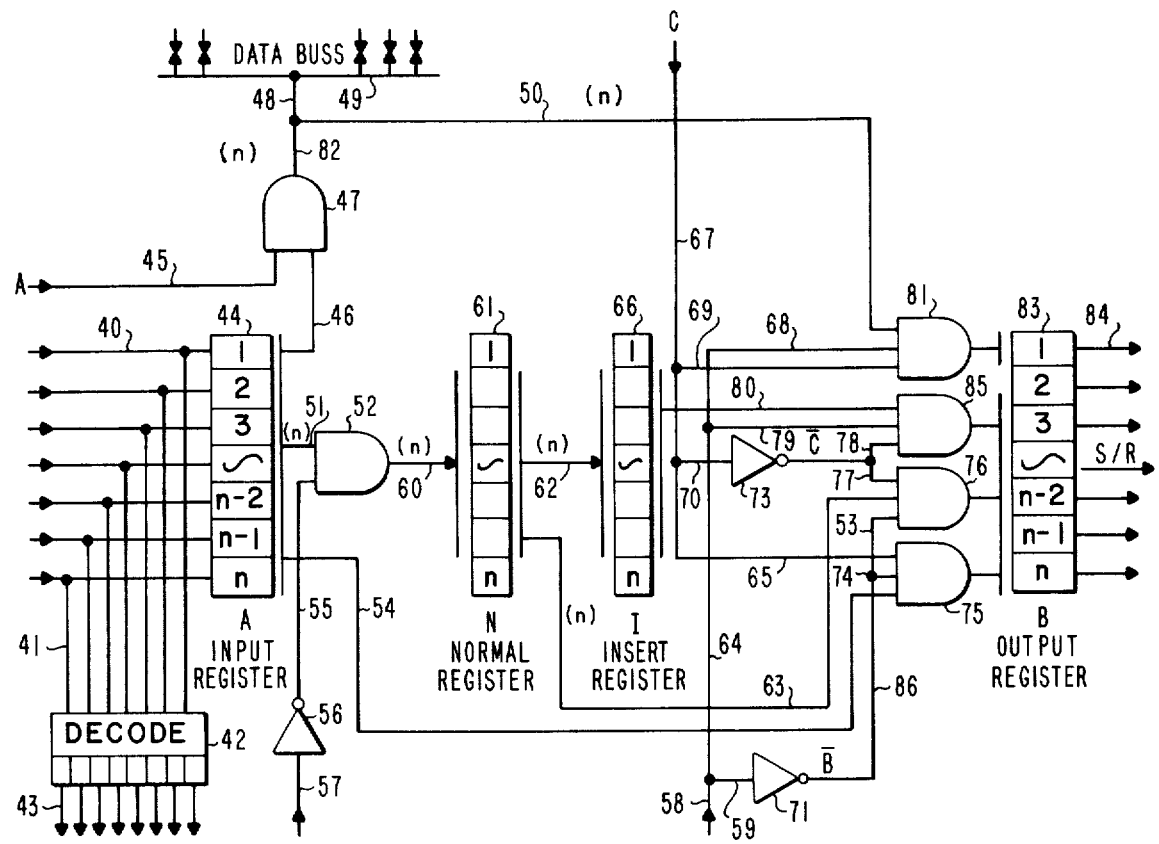
FIG. 5 is a detailed drawing of the preferred embodiment of the shift register of FIG. 2.

For a more detailed description of the subject shift register and control technique, and for an operation description thereof, reference is made to FIG. 5. In FIG. 5 are lines 40 which represent the output lines from the output stage of the shift register and lines 84 which are connected to the input stage of the shift register. Lines 40 from the output stages of the shift register are applied to the input register 44. The input register 44 is as shown for $n$ stages. The output from the shift register applied to lines 40 is also applied along lines 41 to the decode unit 42 which has its output applied along lines 43 to the control logic (not shown). As previously discussed, decode unit 42 decodes the characters appearing on the output lines 40 and provides decoded information to the control logic. More specifically, as will later become apparent the characters decoded by decode unit 42 include dummy codes, delete codes, separator, hold, operation, and record flags, and page end codes.

The output from the input register 44 is as shown applied along line 46 to AND gate 47 which in turn receives the A logical input along line 45 from the control unit. Thus, application of a positive logic logical level to line 45 will cause the character appearing on line 40 to pass through AND gate 47 along lines 82 and 48 to the data buss 49. The data appearing on lines 40 is also applied along line 51 to AND gate 52 which receives another input along line 57 through inverter 56 and along line 55. Thus, application of a positive logical level to line 57 results in AND gate 52 inhibiting passage of data from the input register 44 onto line 60 and into the normal register 61. Application of a negative logical level or D to line 57, acting through inverter 56, causes line 55 to apply a positive logical level to AND gate 52 and thus allows the data from input register 44 to pass into normal register 61 along line 60.

The contents in the input register 44 are also applied along line 54 and to AND gate 75.

The contents of input register 44 which pass through AND gate 52 and along line 60 into the normal register 61 when a low logical level is applied to line 57 are applied along line 62 to the insert register 66. The same data also passes along line 63 to AND gate 76. The data in insert register 66 is also applied along line 80 to AND gate 85.

As shown, a C logical signal is applied along line 67 to lines 69, 70, and 65. Line 69 constitutes another input to AND gate 81, the signal applied to line 70 through inverter 73 is applied to both AND gates 85 and 76, and the signal applied along line 65 is applied to AND gate 75. Further, the B logical signal which is applied to line 58 is also applied along lines 64 and 79 to make up the third input to AND gate 85 and along lines 64 and 68 to make up the third input to AND gate 81. The B logical signal is also applied along line 59, through inverter 71, and along lines 86 and 74 to AND gate 75 and along lines 86 and 53 to AND gate 76. The output of AND gates 75, 76, 81, and 85 are applied to the output register 83 which is connected to the input lines 84 of the shift register.

Thus, from the above, it will be seen that application of a positive logical level to the D line 57 will result in the contents of the A input register 44 being inhibited from passing through AND gate 52 while application of low logical level or $\overline{D}$ signal to line 57 will cause the contents of the input register 44 to be passed through AND gate 52 to the normal register 61. Further, the contents of the normal register 61 always are applied to the insert register 66 and are selectively gated into AND gate 85 by application of a positive logical level to line 58 which is the B logical signal along with the application of a low logical level to line 67 which is the C logical signal.

Thus, unless the B signal is true and the C signal not true the data in insert register 66 will not pass through AND gate 85 to the output register 83.

In addition, as previously described, when the A logical signal is true, the data from the input register 44 is passed through AND gate 47 to the data buss. For input from the data buss 49, AND gate 81 gates data from the data buss 49 along line 50. This will occur as shown when the B and C logical signals are true. Further, data can be gated directly from the normal register 61 along line 63 through AND gate 76 by application of the $\overline{C}$ signal to AND gate 76 in conjunction with the application of a $\overline{B}$ signal to line 58. The $\overline{B}$ signal that is applied through inverter 71 is inverted to cause the conditions into AND gate 76 to be met to pass the information from the normal register 61 into the output register 83. Finally, data from the input register 44 can be passed directly along line 54 through AND gate 75 by application of a $\overline{B}$ signal to line 58 in conjunction with the application of a C logical signal. This will cause the data to pass directly from the input register 44 into the output register 83.

The normal data path that the data takes when there is no data manipulation involved in the flow of data from the output stage to the input stage of the shift register is along lines 40, 51, 60, 63, and 84 in FIG. 5. As shown the normal data flow is from the output stage of the shift register to the A register, then along the $\overline{D}$ path to the N register, and then, bypassing the insert register, along the $\overline{B}$ $\overline{C}$ path to the B register and then into the input stage of the shift register.

The shift register is first loaded by an input operation with dummy codes from the data buss and then control codes are input into the shift register and written over the dummy codes. The control codes initially written into memory include record, operation, separator and hold flags.

Figure 6:
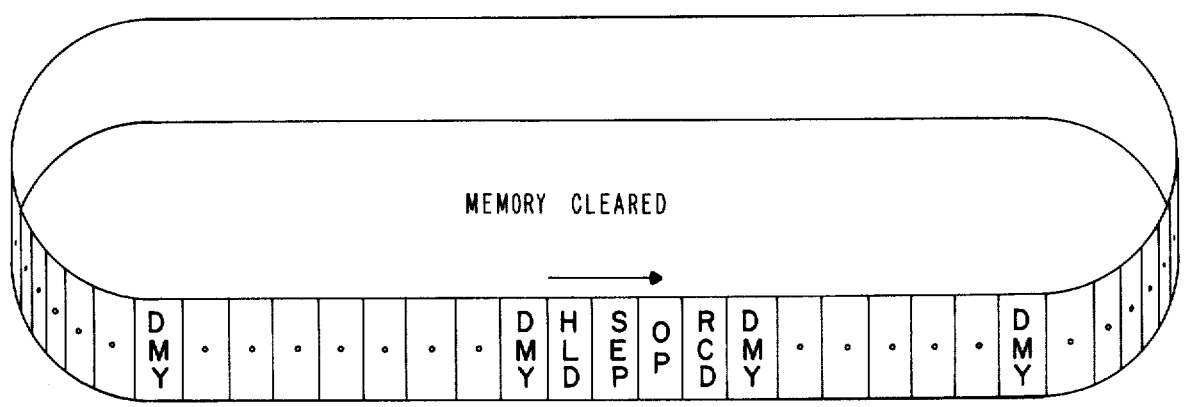
FIG. 6 is a drawing illustrating the arrangement of the record, operation, separator and hold flags when the normal section is addressed and the memory is clear.

With the memory arranged as shown in FIG. 6, the data flow is to the right and the first control code which will be detected is the record flag. The separator flag defines a normal section and an alternate section. The separator and hold flags are in the alternate section while the operation and record flags are in the normal section. The addressing of either section is accomplished by the operator operating a section button on the keyboard.

The operation flag is to always be in the section addressed, and therefore, as shown in FIG. 6, the normal section has been addressed. If the alternate section were addressed the hold and operation flags would be exchanged. To accomplish this the operation flag is detected in the input register and gated to the normal register (FIG. 5). During the same bit time that the operation flag is in the normal register, positive logical signals are applied to the B line 58 and C line 67 and new hold flag is gated into the output register from the data buss. By the same type of operation, the hold flag in the alternate section is replaced with a new operation flag. That is, during the same bit time that the hold flag is in the normal register, positive logical signals are applied to the B and C lines and a new operation flag is gated into the output register from the data buss.

Referring again to FIG. 6, there are no text data codes in memory and the memory is considered clear. Only control codes are present. With the organization as shown, an input zone is defined in the alternate section by the separator and hold flags and the following dummy codes. If text or character data codes denoted by (x) are to be transferred from a bulk store into the input zone, when the separator flag is in the normal register positive logical signals are applied to the B and C lines and data codes are gated to the output register (FIG. 5). Following the data codes, new separator and hold flags are gated to the output register. For this operation, character codes are written over the separator flag, hold flag, and dummy's to the left of the hold flag until the input operation is terminated. Thereafter, following the character codes new separator and hold flags are written back into memory over dummy codes.

Figure 7:
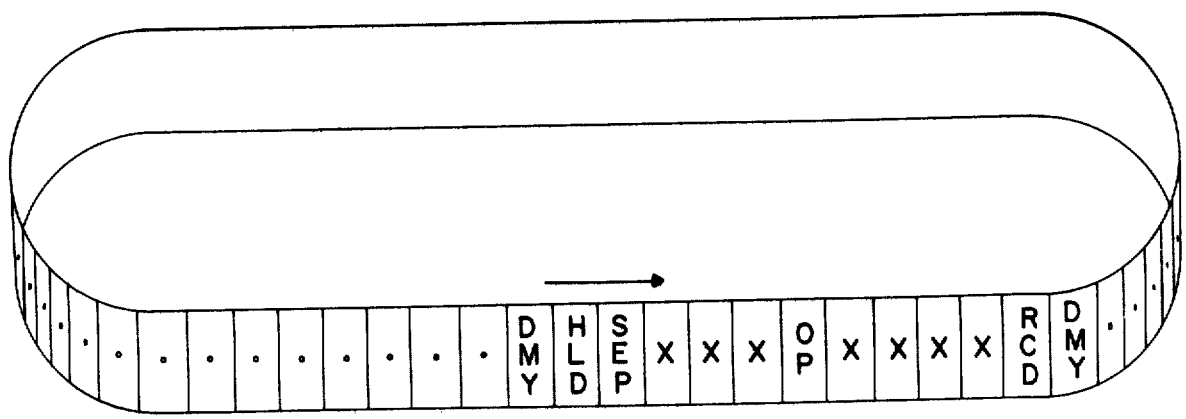
FIG. 7 is a drawing similar to FIG. 6 including text data codes.

The character codes input into the input zone during this operation are in a revision zone upon the rewriting of new separator and hold flags since the revision zone is defined from the record flag to the separator flag. As shown in FIG. 7, the character codes are now in the revision zone and the point of revision is the operation flag. It is assumed that a revision operation has taken place and the operation flag has been moved from a position adjacent the record flag to the current point of revision.

If a record or output operation is signalled with the memory organized as shown in FIG. 7, an output zone has not been defined. A page end code is inserted into memory after the last character code in the revision zone and the operation flag must be repositioned between the page end code and the separator flag. This is accomplished during one memory revolution. With the normal data flow being through the input, normal, and output registers (FIG. 5), when the operation flag is in the normal register a low logical signal is applied to the B line 58 and positive logical signals are applied to the C line 67 and D line 57. The data codes following the operation flag shift from the input register to the output register while the operation flag is held in the normal register. Thereafter, when the separator flag is in the input register a low logical signal is applied to the D line and the separator flag is gated into the normal register. During this same time positive logical signals are applied to the B and C lines and a page end code is gated from the data buss into the output register. The operation flag will now be in the insert register. Then, on the next bit time with a low logical signal applied to the D line, a positive logical signal is applied to the B line and a low logical signal is applied to the C line. The operation flag in the insert register is now gated to the output register and the data flow is through the input, normal, insert, and output registers. Thereafter, when the hold flag is in the output register, low logical signals are applied to the B and C lines and the normal data path through the input, normal, and output registers is restored. The data flow will now be —(DUMMY) (RECORD) (x) (x) (x) (x) (x) (x) (x) (PAGE END) (OPERATION) (SEPARATOR) (HOLD) (DUMMY)—. The operating point for the output operation will be the record flag, and the output operation will terminate after the page end code. During an output operation, the record flag is the address of the next character.

In each event when an output operation is signalled, before the operation is initiated, the operation flag must not be in the output zone. If it is in the output zone, it is deleted, and a new operation flag is inserted after the page end code. During an input operation, if page end codes have been recorded with character data codes and exist in the bulk store, the character and page end codes are transferred to the input zone. In this event, the only concern is that the operation flag is not between the record flag and the page end code when an output operation is initiated. If an output operation is signalled, it can be initiated for the memory organization —(DUMMY) (RECORD) (x) (x) (x) (PAGE END) (x) (x) (OPERATION) (x) (x) (PAGE END) (x) (x) (SEPARATOR) (HOLD) (DUMMY)—. If no page end codes have been recorded and transferred into the input zone, as pointed out above, the page end code is inserted into memory after the character codes and the page end code defines the output zone along with the record flag which is the operating point for output operations.

Figure 8:
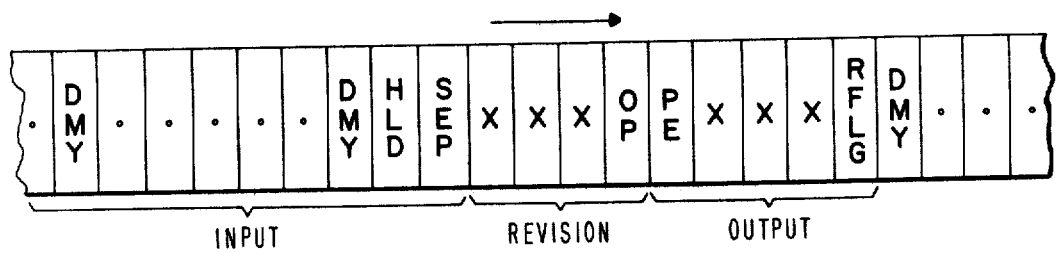
FIG. 8 is a drawing similar to FIG. 7 with input, output, and revision zones defined.

In a similar situation illustrated in FIG. 8, the operation flag is not in the output zone and the transfer into a bulk store will be from the record flag to the page end code. At the end of the output operation the record flag will be positioned to the right of the operation flag since the page end code will have been tranferred to the bulk store along with the character data codes. Again, the record flag is the operating point and address of the next character for an output operation.

During an output operation, the record flag is held in the normal register while characters are output and is reinserted in the data flow at the end of the output operation. For the data flow —(DUMMY) (RECORD) (x) (x) (x) (x) (PAGE END) (OPERATION) (x) (x) (SEPARATOR) (HOLD) (DUMMY)— at the beginning of an output operation, the data flow at the end of an output operation will be —(DUMMY) (x) (x) (x) (x) (PAGE END) (RECORD) (OPERATION) (x) (x) (SEPARATOR) (HOLD) (DUMMY)—.

For a check/read operation following an output operation, the record flag is to be repositioned at the beginning of the output zone. The record flag is held in the normal register and reinserted in the data flow upon detection of the first character code on the next memory revolution. If however, a revision operation is occurring simultaneously in the revision zone, the operation flag is the control code being held and the record flag must be deleted and reinserted into the data flow. This is because no means are provided for holding both the record and operation flags.

If the alternate section is addressed and the operation and hold flags are exchanged as described above, the input point in the alternate section is the first dummy code following the separator flag. For the data flow —(DUMMY) (RECORD) (x) (x) (PAGE END) (HOLD) (x) (x) (SEPARATOR) (OPERATION) (DUMMY)— before an input operation, the data flow will be —(DUMMY) (RECORD) (x) (x) (PAGE END) (HOLD) (x) (x) (SEPARATOR) (OPERATION) (x) (x) (DUMMY)— after an input operation. The revision zone is now from the separator flag to the first dummy code and in the alternate section.

As mentioned above, the alternate section is addressed by the operator operating a section button on the keyboard. It is assumed for purposes herein that when the button is "up" the normal section (from the record flag to the separator flag) is being addressed. When the button is "down", the alternate section (from the separator flag to the first dummy code) is addressed.

Figure 9:
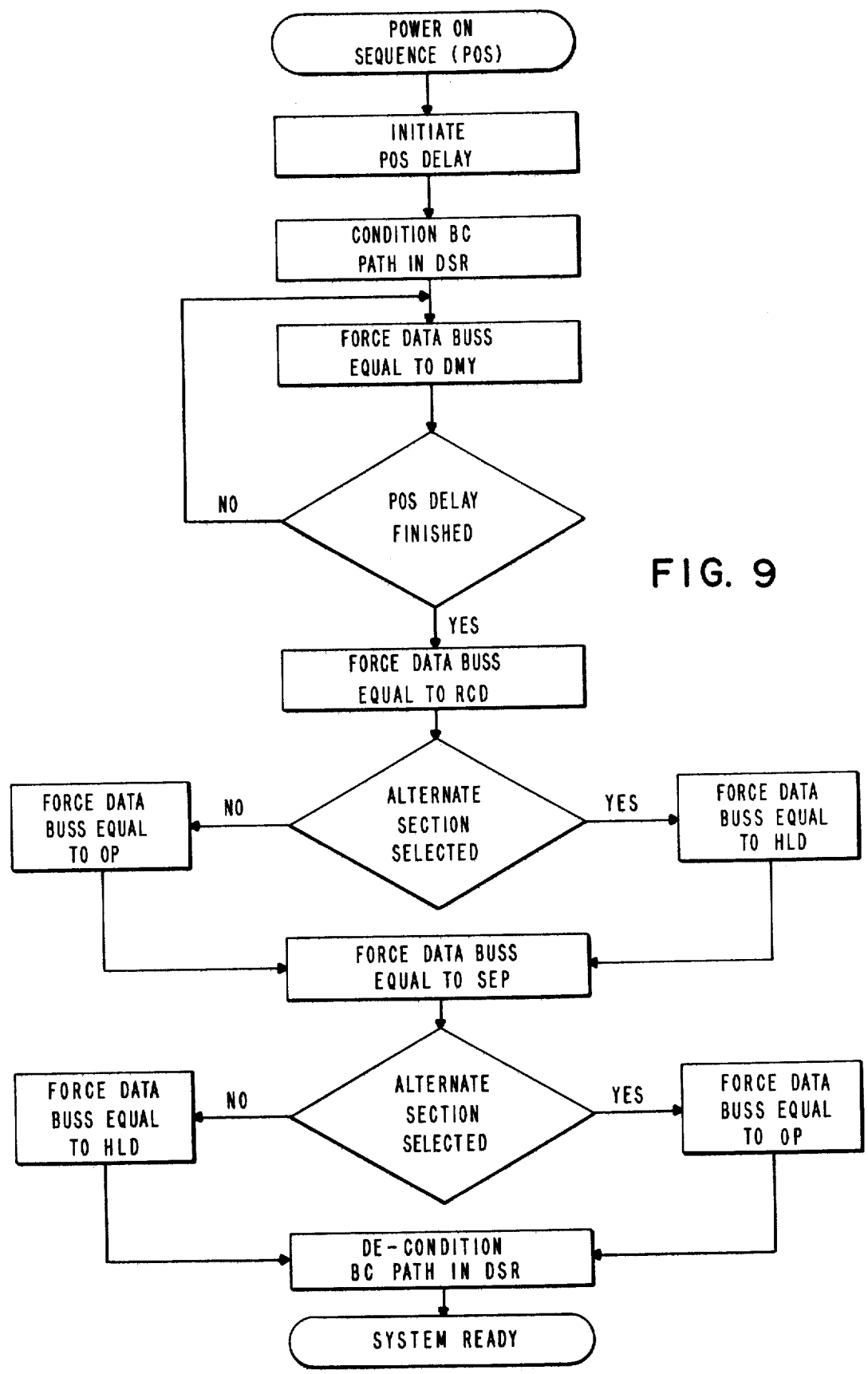
FIG. 9 is a flow chart illustrating the operation of arranging the shift register memory for control of input and revision operations during start up.

Referring to FIG. 9, there is depicted a power-on sequence and an operation for organizing or arranging the memory. When the power is turned on, a power-on sequence delay of one memory revolution will be initiated and path BC in FIG. 3 will be activated. Thereafter, dummy codes are input into memory from the data buss until the memory is full. This will take one memory revolution. Then a record flag is input into memory. If the section button is "up", an operation flag is input into memory following the record flag. A separator flag is then input into memory following the operation flag. Thereafter, a hold flag is input into memory and the memory is organized as shown in FIG. 6. Had the section button been "down" and the alternate section selected after the record flag were input to memory, a hold flag followed by a separator and operation flag would be input into memory.

Referring now to FIGS. 9b and 9c, a preferred embodiment is shown of a logical implementation of the memory setup operation described above and depicted by the flow diagram of FIG. 9. Reference is also made to FIG. 9a which shows the timing sequence of the operations of the logical elements of FIGS. 9b and 9c. When power is applied to the system, a positive power-on reset (POR) signal is applied for a period of time that equals or exceeds one revolution of the dynamic shift register buffer. The POR signal is applied along line 201 to lines 202, 203, and 228. The signal applied along line 202 is applied to AND gate 213 and along line 209 to inverter 210. The signal applied along line 203 is applied to one bit delay 204. The signal applied along line 228 is applied to OR gate 235 and along the set line 229 to flip flop 230. The positive output POR D1 from delay 204 is applied along line 205 to AND gate 213 which generates a positive FDMY output signal along line 214 to drive dummy code inserter 216 to gate a succession of dummy codes along n lines 218 and onto the data buss 220.

FIG. 9d shows a circuit that may be used for code inserter 216 as well as other code inserters to be described hereinafter. In FIG. 9d, code generator 279 of code inserter 278 may be an n bit register loaded with an n bit code corresponding to the desired code to be inserted. Alternatively, code generator 279 may simply include a voltage source connected to individual bit lines that have a positive or "1" value corresponding to the "1's" digits in the code sequence of the code to be inserted, with the lines having a "0" value being grounded. AND gate 280 is representative of a plurality of n AND gates, one for each bit line, through which the bits of the code are gated onto the data buss by application of an external signal to an input of the AND gates.

During the time both POR D1 and POR are positive, therefore, every storage location of the dynamic shift register buffer 102 (FIG. 1) is loaded with a dummy code. Also, as illustrated in FIG. 9a, before the termination of the POR D1 signal a record flag is loaded into the dynamic shift register buffer.

Referring again to FIG. 9b, the POR D1 signal applied along line 205 is also applied along line 206 to AND gate 212. The other input to AND gate 212 is from inverter 210 along line 211. AND gate 212 is used for generating a positive FRCD output signal along line 215 to drive record flag inserter 217 to gate a record flag along n lines 219 and onto the data buss 220.

The POR D1 signal applied along line 205 is also applied along line 207 to inverter 208. The output of inverter 208 is along line 221 to AND gate 461. The output of inverter 208 along line 221 is also applied along line 222 to AND gate 223 and along line 227 to AND gate 227. The other input to AND gate 461 for gating a signal along line 237 is obtained with flip flop 230 is set. This SETUP 1 signal is applied along line 231. Line 237 is the set line for flip flop 238. The SETUP 1 signal applied along line 231 is applied along line 233 to AND gate 227 and along line 234 to AND gate 225. This signal is also applied along line 232 to AND gate 223. When flip flop 238 is set, a SETUP 2 signal is applied along the reset line 239 to flip flop 230. This SETUP 2 signal is also applied along line 240 to AND gate 224, along line 242 to AND gate 225, and along line 241 to AND gate 226.

The positive SETUP 1 and SETUP 2 signals applied along lines 231 and 239 are also applied along lines 269 and 270, and 273 and 274, respectively, and gated through OR gates 271 and 275 to drive the B control line 272 and the C control line 276 (FIG. 5) of the shift register control logic. This is illustrated in FIG. 9c.

The output of OR gate 235 is along the reset line 236 to flip flop 238. When flip flop 238 is reset, a SETUP 2 signal is applied along line 246 to AND gate 223 and along line 247 to AND gate 227. When flip flop 230 is reset a $\overline{\text{SETUP 1}}$ signal is applied along line 243 to OR gate 235 and along line 244 to AND gate 224. The signal appearing on line 244 is also applied along line 245 to AND gate 226.

As illustrated in FIG. 9a opposite "INPUTS" the addressing of the alternate section is represented by the dotted line. The solid line respresents the addressing of the normal section. In like manner the dotted and solid lines for FOP and FHLD correspond thereto.

Referring again to FIG. 9b, when the alternate section is addressed, a positive logical level is applied along line 248 to inverter 249. This signal is also applied along line 250 to AND gate 227 and along line 251 to AND gate 224. The output of inverter 249 is along line 252 to AND gate 226 and along line 253 to AND gate 223.

When all positive inputs are applied to AND gate 223, a positive FOP signal is generated and applied along line 254, through OR gate 256, and along line 257 to drive operation flag inserter 258 to gate an operation flag along n lines 259 and onto data buss 220. In like manner, when all inputs to AND gate 224 are positive an FOP signal is generated and applied along line 255, through OR gate 256, and along line 257 to operation flag inserter 258. The output of either AND gate 223 or AND gate 224 and the timing thereof will depend upon the section addressed and the position in the memory in which the operation flag is to be written.

When both of the inputs to AND gate 225 are positive, a positive FSEP signal is generated and applied along line 260 to drive separator flag inserter 261 to gate a separator flag along n lines 262 and onto the data buss 220.

A hold flag will be gated onto the data buss according to the timing set out in FIG. 9a and depending upon the section addressed. When all of the inputs to AND gate 226 are positive, a positive FHLD signal is generated and applied along line 263, through OR gate 265, along line 266 to drive hold flag inserter 267 to gate a hold flag along n lines 268 and onto the data buss 220. When all of the inputs to AND gate 227 are positive, a FHLD signal is generated and applied along line 264, through OR gate 265, and along line 266 for driving hold flag inserter 267 to gate a hold flag along n lines 268 and onto the data buss 220. If the normal section were addressed during the set-up operation illustrated in FIGS. 9a, b, and c, then the memory would be organized as illustrated in FIG. 6.

Figure 10:
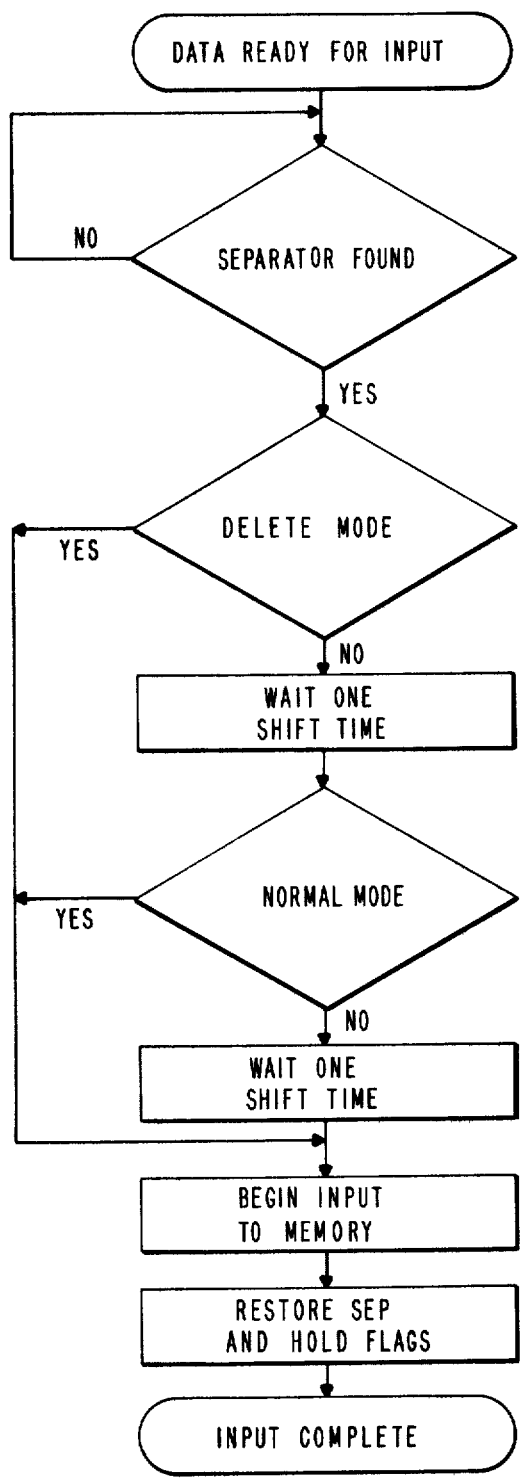
FIG. 10 is a flow chart illustrating the detection of the control code defining the input zone, the input of data codes, and the rewriting of control codes to define a new input zone when the operation flag is in the normal section.

Referring to FIG. 10, with the memory organized as shown in FIG. 7, the memory is scanned or loops until the separator flag is found or detected. If an overlapped operation is occurring in the revision zone and involves a delete mode with characters being deleted, then the operating point for an input operation is the separator flag and data from the bulk store is transferred into memory. Following the input from the bulk store, new separator and hold flags are input, completing the input operation. In this case, the hold and separator flags and dummy codes to the left of the hold flag are writted over with inputted character codes. If the delete mode has not been entered into, the operation is delayed one data shift time, and a determination is made as to whether the system is operating in a normal mode. A normal mode is defined to be one where no operation is occurring in the revision zone. If in the normal mode, the input operation in the input zone begins one data shift after the detection of the separator flag. If the system is not in the normal mode or the delete mode, the operation is delayed two data shift times after detection of the separator flag, and then this input operation is initiated.

Figure 10B:
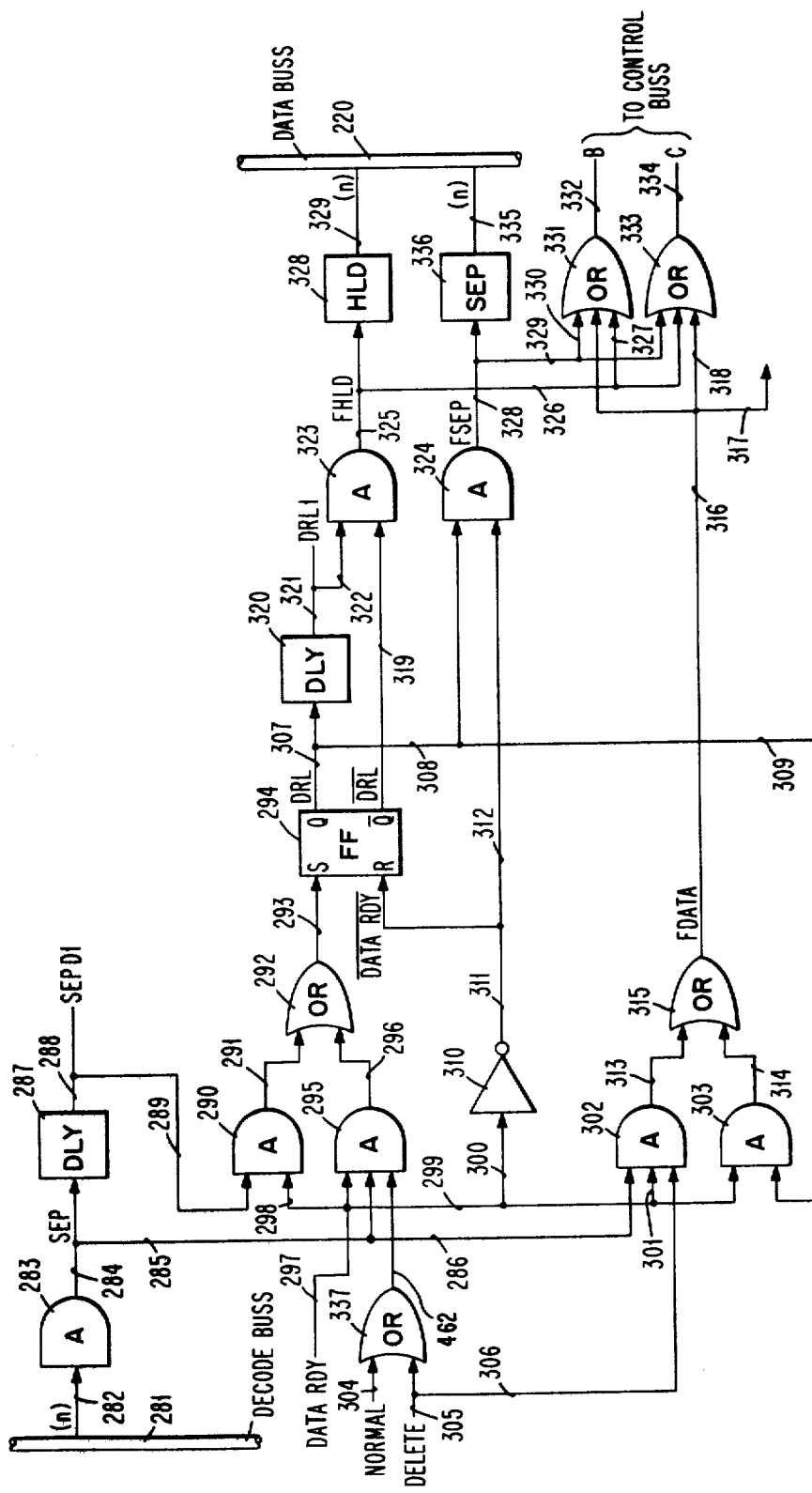

Referring now to FIG. 10b, a preferred embodiment is shown of a logical implementation of the overlapped input operation described above and depicted by the flow diagram of FIG. 10. Reference is also made to FIG. 10a which shows the timing sequence of the operations of the logical elements of FIG. 10b. During the decode of the data and control code flow in the shift register buffer or memory, signals are applied along lines 41 in FIG. 5. Lines 41 are equivalent to the decode buss 281 and n lines 282 illustrated in FIG. 10b. An output along n lines 282 is applied to AND gate 283. When a bit pattern representative of a separator code is applied along n lines 282 to AND gate 283, a signal is generated and applied along line 284 to one bit delay 287 and along line 285 to AND gate 295. The SEP D1 output from delay 287 is applied along lines 288 and 289 to AND gate 290. The other input to AND gate 290 is the DATA RDY signal applied along lines 297 and 298. It is to be noted that once the data ready signal comes up or becomes high as illustrated in FIG. 10a, it will remain up and will only go down or low after data has been input. That is, when F DATA has been up for as many character times as are needed for input, then the DATA RDY signal will be permitted to go down. The output of AND gate 290 is along line 291, through OR gate 292, and along the set line 293 to flip flop 294. When flip flop 294 is set, a DRL output is applied along line 307 to one bit delay 320, along line 308 to AND gate 324, and along line 309 to AND gate 303. The DRL1 output from delay 320 is applied along lines 321 and 322 to AND gate 323. The DATA RDY signal applied along line 297 is also applied along lines 299 and 300 to inverter 310. The output of inverter 310 is applied along the reset line 311 to flip flop 294 and along line 312 to AND gate 324. Further, the DATA RDY signal applied along line 297 is also applied along line 301 to AND gate 302 and along line 299 to AND gate 303. With both a DATA RDY signal along line 299 and DRL signal applied along line 309, AND gate 303 is caused to generate a positive F DATA signal along line 314, through OR gate 315, and along line 316. The F DATA signal applied along line 316 is applied to OR gate 331 to drive the B control line 332, and along line 318 to OR gate 333 to drive the C control line 334 of the shift register control logic. The F DATA signal applied along line 316 is also fed back along line 317 to allow the DATA RDY signal shown in FIG. 10a to go down and to gate data onto the data buss 220. If the operation involves the delete mode, a signal is applied along line 305 to OR gate 337. This signal is also applied along line 306 to AND gate 302. With a separator signal applied to AND gate 302 along line 286, a DATA RDY signal applied to AND gate 302 along line 301, and the delete mode signal applied to AND gate 302 along line 306, an F DATA signal is generated and applied along line 313, through OR gate 315, and along line 316 for the control of the B line 332 and the C line 334. The delete mode signal applied along line 305 is also applied to OR gate 337 and along line 462 to AND gate 295. The output of AND gate 295 is along line 296, through OR gate 292, and then along the set line 293 to flip flop 294. Another input to AND gate 295 can be the normal mode signal applied along line 304 to OR gate 337.

When the DATA RDY signal applied along line 297 goes down, flip flop 294 will be reset along the reset line 311. When flip flop 294 has been reset a signal is applied along line 319 to AND gate 323 which generates a positive FHLD output signal along line 325 to drive the hold flag inserter 328 to gate a hold flag along n lines 329 and onto the data buss 220. The FHLD signal applied along line 325 is also applied along line 326 to OR gate 333 for controlling the C control line 334 and along line 327 to OR gate 331 for controlling the B control line 332. Since the input into AND gate 323 is delayed through delay 320, the hold flag will be written onto the data buss following the writing of the separator flag. That is, when the DATA RDY signal goes down, a positive input is applied along line 312 to AND gate 324. With flip flop 294 set, a signal is applied along line 308 to AND gate 324 which generates a positive FSEP output signal along line 328 to drive separator flag inserter 336 to gate a separator flag onto n lines 335 and onto the data buss 220. The signal applied along line 328 is also applied along line 329 to OR gate 333 for controlling the C control line 334 and along line 330 to OR gate 331 for controlling the B line 332.

The hatched lines illustrated in the timing diagram of FIG. 10a illustrate the timing depending upon the mode defined at the bottom of the figure.

Figure 11:
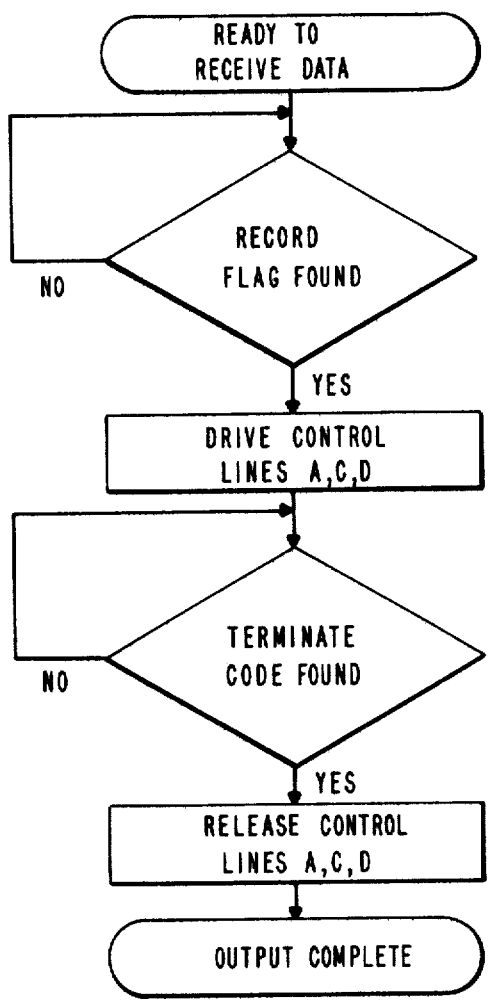
FIG. 11 is a flow chart illustrating the operation of the system when an output zone has been defined in the normal section.

Referring to FIG. 11, when an output operation is to occur and the operation flag is not in memory between the record flag and the page end code, then the data contained in memory is transferred into a bulk store from the record flag through the page end (terminate) code. The record flag will now be positioned after the page end code. During the output operation the record flag is held in the normal register and allowed to re-enter memory following the detection of the page end code. Thereafter, upon the next memory revolution dummy codes can be input from the data buss and written over the character codes which have been output to the bulk store.

Figure 11B:
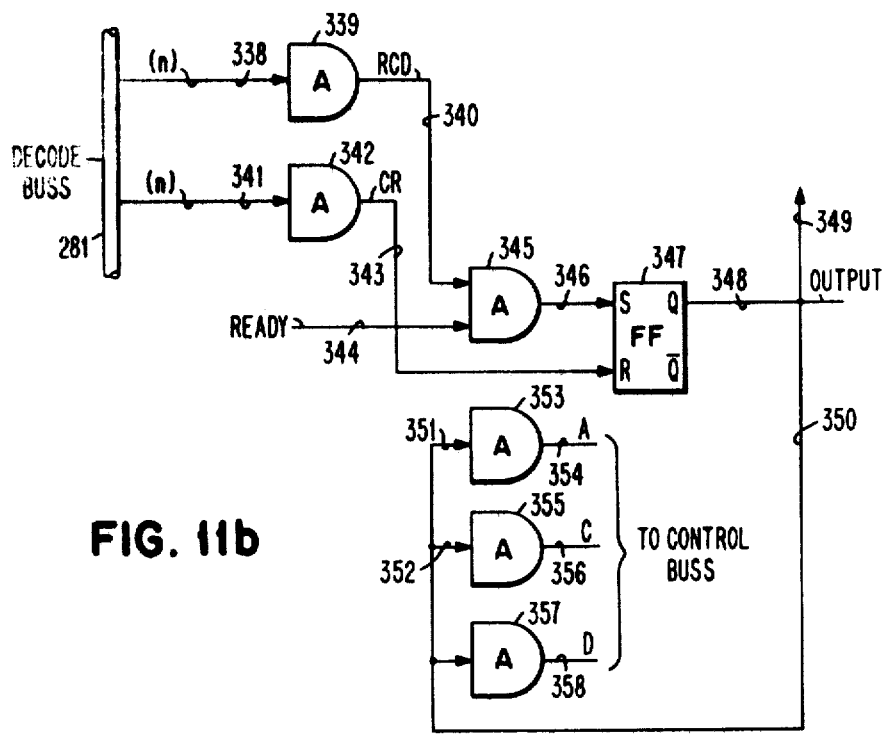

Referring next to FIG. 11b, a preferred embodiment is shown of the logical implementation of the over-lapped output operation described above and depicted by the flow diagram of FIG. 11. Reference is also made to FIG. 11a which shows the timing sequence of the operations of the logical elements of FIG. 11b. When a record flag in the data flow appears on decode buss 281 and along n lines 338, AND gate 339 will generate an RCD signal along line 340 to AND gate 345. With a ready signal applied along line 344 to AND gate 345, a signal is gated along set line 346 to flip flop 347. When flip flop 347 is set, a signal is applied along the output line 348. This signal is also applied along line 349 and fed back to reset the ready condition and to allow data to be received. The output along line 348 is further applied along line 350 to AND gate 357 for driving the D control line 358, along line 351 to AND gate 353 for driving the A control line 354, and along line 352 to AND gate 355 for driving the C control line 356.

The operation can be terminated upon detection of a control code such as a carrier return (CR) code. When a CR code is to serve such a purpose and it appears on decode buss 281 and along n lines 341, AND gate 342 will generate a CR signal along the reset line 343 to flip flop 347. This will result in the A, C, and D control lines being driven negative or turned off.

Figure 12:
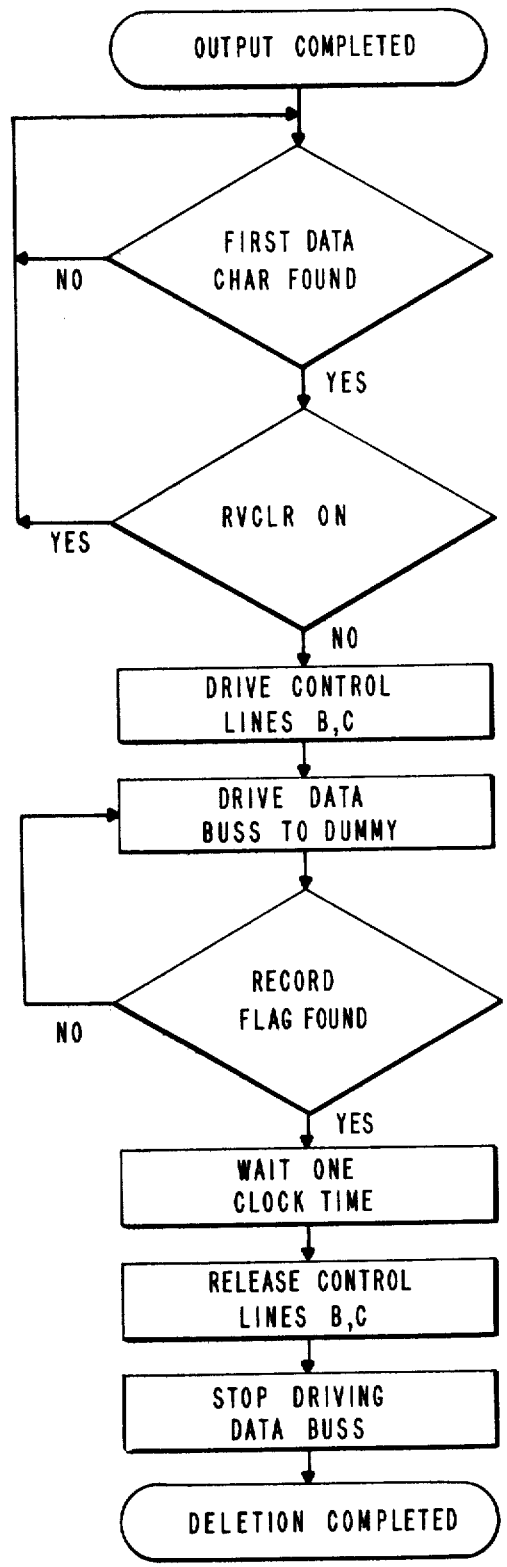
FIG. 12 is a flow chart illustrating the replacement of data codes contained in the output zone with dummy codes after an output operation.

Referring to FIG. 12, after the output operation has been completed and the character codes output to the bulk store are to be deleted, the memory is scanned for the first non-dummy (first data character code). If the reverse and clear bit is not "on" (the reverse and clear bit is a logical control signal which allows the delete operation to be performed), dummy codes are input from the data buss into memory up to the record flag.

Figure 12A:
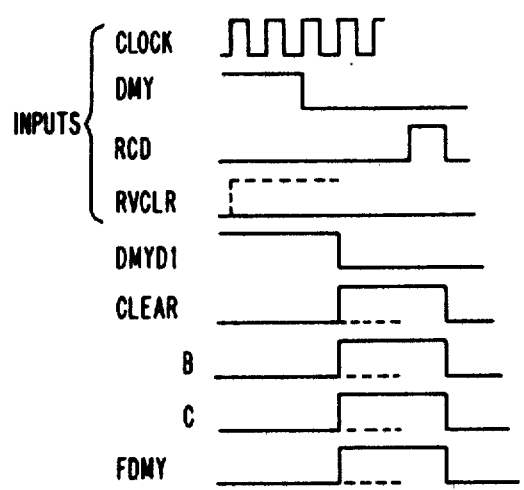
Figure 12B:
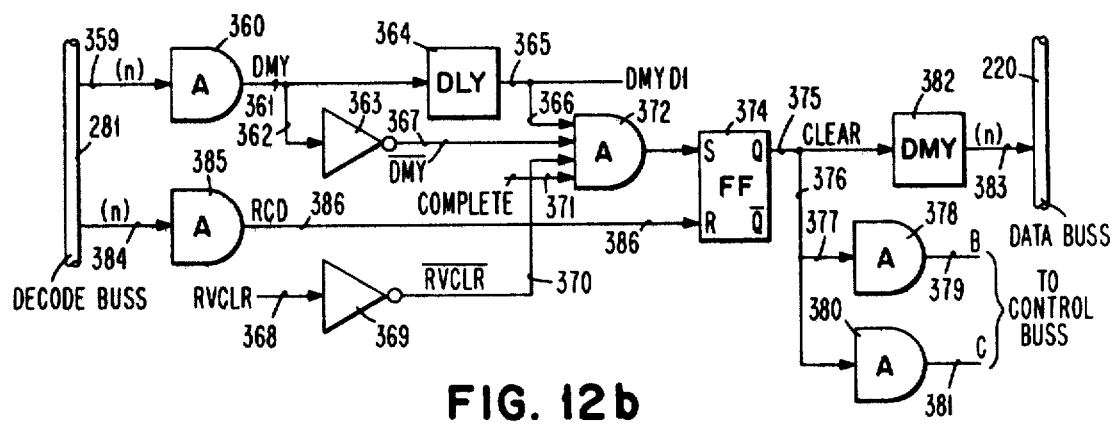

Refer next to FIG. 12b wherein there is illustrated a preferred embodiment of a logical implementation of the overlapped data deletion operation described above and depicted by the flow diagram of FIG. 12. Reference is also made to FIG. 12a which shows the timing sequence of the operation of the logical elements of FIG. 12b. When a dummy code appears along decode buss 281 and n lines 359, AND gate 360 will generate a DMY signal which is applied along line 361 to one bit delay 364. This DMY signal is also applied along line 362 to inverter 363. The inverted signal is applied along line 367 to AND gate 372. The output DMY D1 along line 365 from delay 364 is applied along line 366 to AND gate 372. Another input to AND gate 372 is RVCLR along line 368 which is inverted by inverter 369 and applied along line 370. Yet another input to AND gate 372 is a complete signal along line 371. When all positive inputs are applied to AND gate 372, a signal is applied along the set line 373 to flip flop 374. When flip flop 374 is set, a clear signal is applied along line 375 to drive dummy code inserter 382 to gate a dummy code along n lines 383 and onto the data buss 220. The output along line 375 is also applied along line 376 to AND gate 380 for driving the C control line 381 and along line 377 to AND gate 378 for driving the B control line 379. When a record flag appears on decode buss 281 and along n lines 384, AND gate 385 will generate an RCD signal along the reset line 386 to flip flop 374. This will result in the turning off of the B and C control lines and the dummy code inserter 382.

If the RVCLR input were up at the time the operation might begin, then the overlapped deletion operation would be delayed one revolution of the shift register memory. This is represented by the dotted lines shown in FIG. 12a.

Figure 13A:
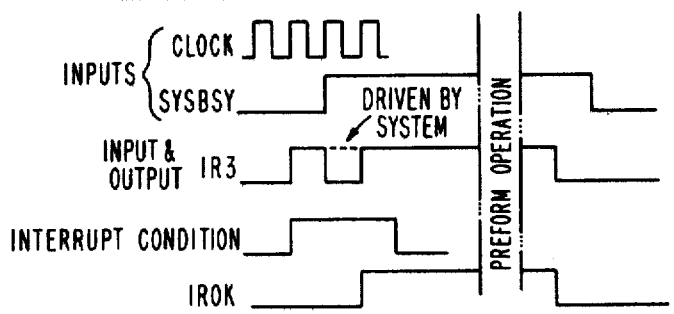
Figure 13:
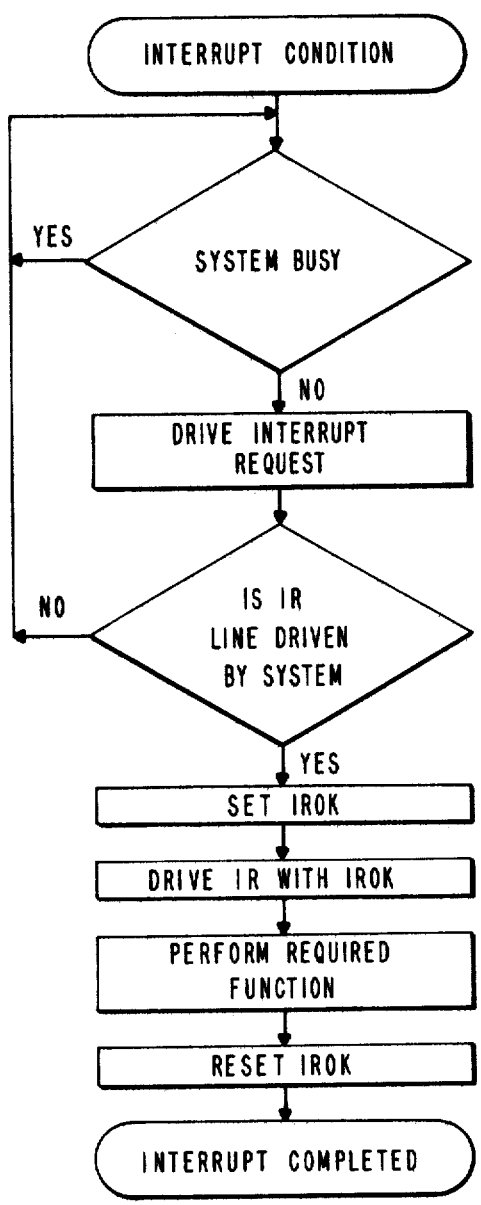
FIG. 13 is a flow chart illustrating an interrupt operation.

Referring to FIG. 13, an interrupt scheme is depicted where, for example, the system is interrupted and only one operation is to occur during any memory revolution. In certain instances overlapped operations are not possible due to the structure of the system. In these instances only one operation can be performed during a memory revolution. One such instance is for the data flow —(DUMMY) (RECORD) (x) (x)'(OPERATION) (x) (x) (x) (PAGE END) (x) (x) (SEPARATOR) (HOLD) (DUMMY)—when an output operation is to be initiated. As pointed out above, the output zone is defined from the record flag through the page end code, and the operation flag must not be in the output zone. At the time an output operation is signalled for the above data flow, an interrupt condition exists since the operation flag is in the output zone. As pointed out above, during one memory revolution the page end code can be inserted and the operation flag repositioned, but an output operation cannot be performed during the same memory revolution. If the system is busy performing another operation, the operation being performed continues until completed, and then an interrupt request line could be driven (or activated by a signal) to control the system for the insert and reposition operation. If the insert and reposition operation were a priority operation, as will be more fully described with reference to FIG. 14, a flip flop (IROK) would be set and would drive the interrupt request line. At this time the insert and reposition operation is performed. At the end of this insert and reposition operation the flip flop is reset and overlapped operations including initiation of the signalled output operation can again occur.

Figure 14A:
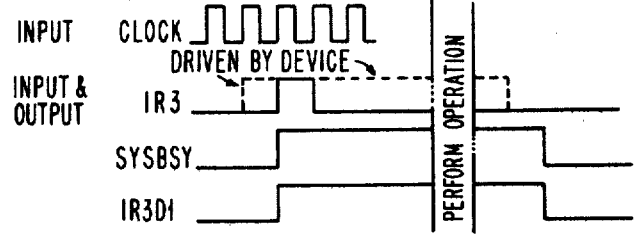
Figure 14:
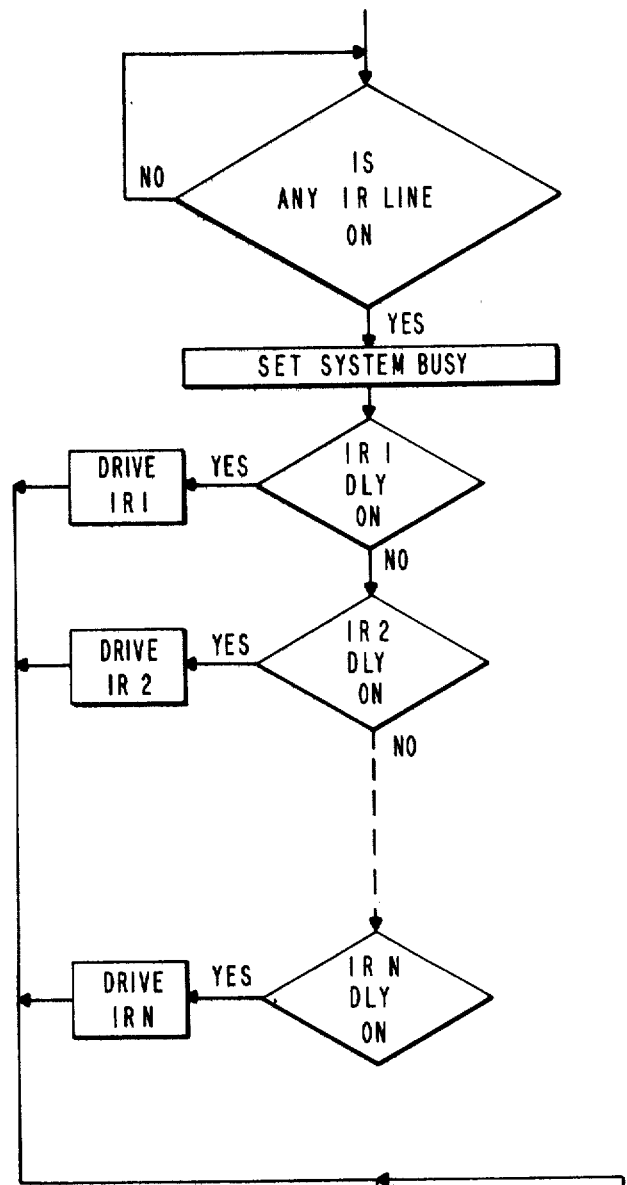
FIG. 14 is a flow chart illustrating the control by the system control logic of the priority of interrupt operations.

Referring to FIG. 14, when a determination is made as to whether the interrupt request line is driven by the system (FIG. 13), this will depend on the priority assigned in the system configuration to the performance of a particular operation. Some operations are assigned higher priorities than others. For example, an input operation might be assigned a first priority. With respect to the output operation described with reference to FIG. 13, this could have been a second priority operation, and the input operation would be performed before the control of the system was dedicated to the output operation. Assuming n interrupt request lines and n bits of delay, if any interrupt request line is on, the system busy flip flop is set and a determination is made as to which interrupt request delay bit is "up" and the operation is performed. During the performance of the operation the interrupt request line will remain on until the operation is completed whereupon the system busy flip flop will be reset.

Figures 13B, 14B:
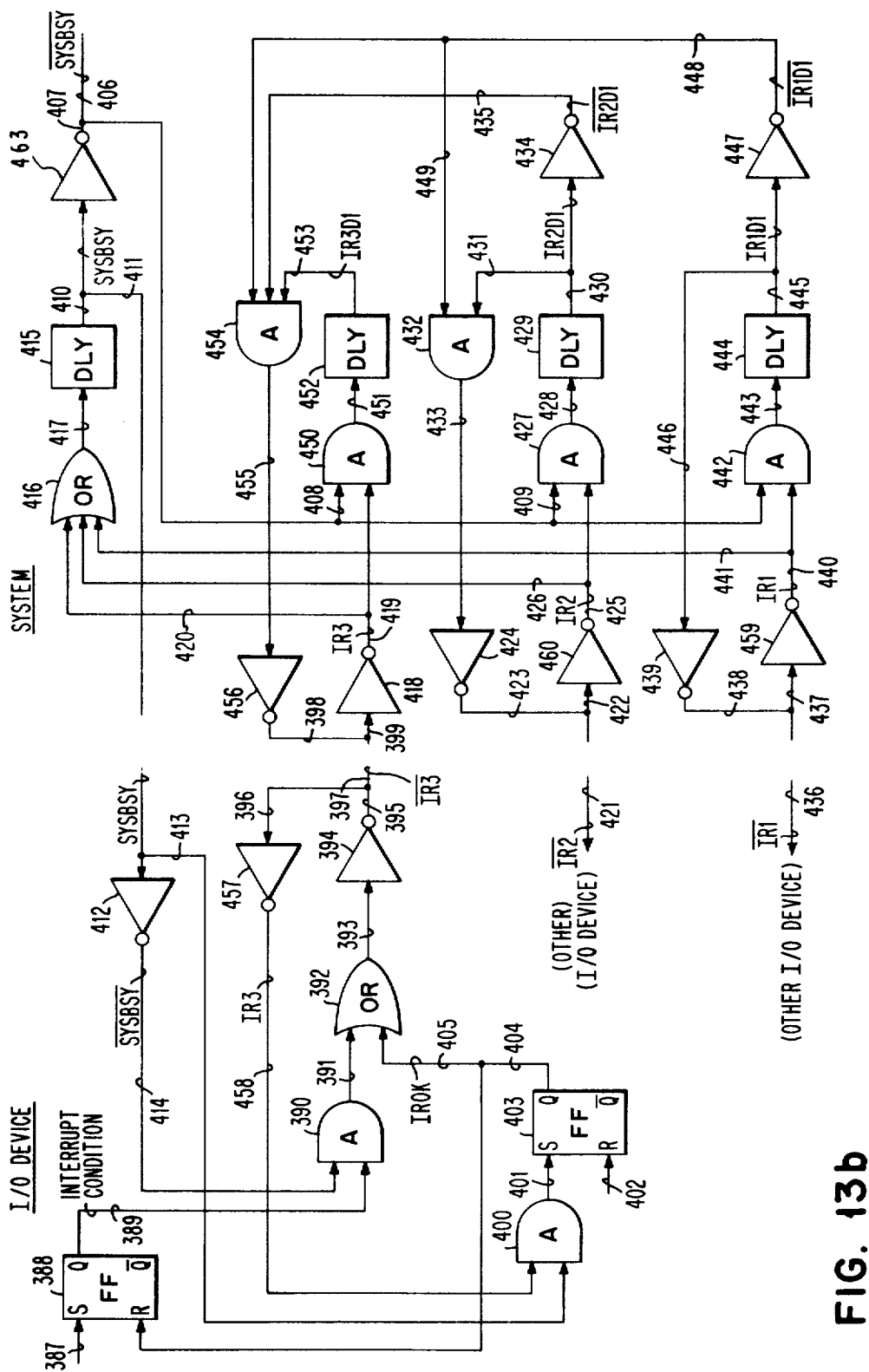

Referring now to FIGS. 13b and 14b, preferred embodiments are shown of logical implementations of device and system interrupt request control, respectively, described above and depicted by the flow diagrams of FIGS. 13 and 14. Reference is also made to FIGS. 13a and 14a which show the timing sequence of the operations of the logical elements of FIGS. 13b and 14b. When a signal representative of the status of the I/O device is applied along the set line 387 to flip flop 388 and flip flop 388 is set, an interrupt condition or signal is applied along line 389 to AND gate 390. The other input to AND gate 390 is determined by the signal appearing on line 397, and the inputs applied along lines 421 and 436, which represent interrupt request lines from other devices that may be in the system.

A positive output from AND gate 390 is possible only if signals along lines 397, 421, and 436 are negative and were negative one bit or shift time earlier. As is obvious, one bit time after a request is applied along any of these lines, the output along line 391 will be negative. The feeding back of signals from the system to the device will provide for the honoring of an interrupt request along one of these lines. Any one of lines 397, 421, and 436 can initially be driven only if the signal appearing on line 414 is positive.

The IR1-nD1 signals will determine priority. In the embodiment shown for three interrupt lines, priority will be determined by the output of AND gates 454 and 432, respectively. IR1 has first priority, unconditionally.

An input applied along line 421 is applied along line 422, through inverter 460, and along lines 425 and 426 to OR gate 416. The output of OR gate 416 is along line 417 to one bit delay 415. The output from delay 415 is along line 410 to inverter 463 and along line 411 to inverter 412. The output of inverter 412 provides the other input to AND gate 390 along line 414. The output of AND gate 390 is along line 391, through OR gate 392, and along line 393 to inverter 394. The output of inverter 394 is along lines 395 and 396 to inverter 457. The output of inverter 457 is along line 458 to AND gate 400. The other input to AND gate 400 is derived from the output of delay 415 along lines 410, 411, and 413. The output of AND gate 400 is along the set line 401 to flip flop 403. When flip flop 403 is set, an IROK signal is applied along the reset line 404 to flip flop 388 and along line 405 to OR gate 392. The reset of flip flop 403 results from a signal supplied by an I/O device indicating the end of the operation in the device.

Another input to one bit delay 415 is initially derived along lines 436 and 437, through inverter 459, and along lines 440 and 441 to OR gate 416. The output of inverter 459 is also applied along line 440 to AND gate 442. The other input to AND gate 442 is derived from the output of inverter 463 along lines 407 and 406. When both inputs to AND gate 442 are positive, a signal is gated along line 443 to one bit delay 444. The positive output of one bit delay 444 is an IR1D1 signal along line 445 to inverter 447 and along line 446 to inverter 439. The output of inverter 439 is applied along lines 438 and 437 to inverter 459, and along line 436 back to the I/O device. The use of inverters in the device and the system permit bidirectional control of a single line by both a device and the system. The IR1D1 output from delay 444 along line 445 is applied through inverter 447 and along line 448 to AND gate 454. Another input to AND gate 454 is derived from the signal applied along lines 421 and 422 to inverter 460. The output of inverter 460 along line 425 is applied to AND gate 427. The other input to AND gate 427 is along lines 407 and 409 from inverter 463. When both inputs to AND gate 427 are positive, a signal is applied along line 428 to one bit delay 429. The positive output of one bit delay 429 is an IR2D1 signal along line 430 to inverter 434 and along line 431 to AND gate 432. The output of inverter 434 along line 435 constitutes another input to AND gate 454. The first described input to AND gate 454 is also applied along line 449 to AND gate 432. When the signals on both lines 431 and 449 are positive, a signal is gated along line 433, through inverter 424, and along lines 423 and 422 to inverter 460, and also along line 421 back to the I/O device. The remaining input to AND gate 454 is derived from the signal applied along lines 397 and 399 to inverter 418. The output of inverter 418 is along lines 419 and 420 to OR gate 416 and along line 419 to AND gate 450. The other input to AND gate 450 is from inverter 463 along lines 407 and 408. When both inputs to AND gate 450 are positive, a signal is gated along line 451 to one bit delay 452. The output of delay 452 is an IR3D1 signal along line 453 to AND gate 454. When all of the inputs to AND gate 454 are positive, a signal is gated along line 455, through inverter 456, and along lines 398, 397, and 396 to inverter 457. The output of inverter 456 is also applied along lines 398 and 399 to inverter 418. The output of inverter 418 is applied along lines 419 and 420 to OR gate 416.

Referring specifically to FIGS. 13a and 14a, the hatched lines opposite IR3 represent the timing when this line is driven by the system and device, respectively.

It is to be noted that although in FIG. 14 there are illustrated IRn lines, only three such lines are illustrated in FIG. 14b for purposes of clarity. Any extension beyond three interrupt request schemes set out would be considered completely obvious to one skilled in the art.

It is to be appreciated that the interrupt request lines serve three purposes: 1) they are used by the devices to request control of the system if the SYSBSY signal on line 411 is negative, 2) one bit time later, the system drives one of the interrupt request lines on a priority basis to signal one of the devices that its request has been honored, and 3) thereafter the interrupt request line is driven by the device whose request was honored to control the system for the duration of the operation to be performed. This technique results in a minimum number of control lines.

In summary, as the beginning of operation the shift register is loaded with dummy codes. Control codes such as record, operation, separator, and hold flags are then input into the shift register and writted over dummy codes. The input of a separator flag defines a normal section and an alternate section in the shift register. The hold and operation flags are the addresses of the next character for various operations in each of the sections, and the record flag is the operating point for an output operation in the normal section. When one of the sections is addressed by an operator and that section does not contain the operatio flag, the hold and operation flags are exchanged. This exchange is for the purposes of having the operation flag in the section addressed.

Regardless of the section addressed, after a page end code has been inserted and exists in memory between the record and operation or hold flags, an output zone is defined. That is, in the normal section an output zone is defined which extends from the record flag through the page end code.

Upon detection of those control codes defining an input zone, text data codes such as characters and spaces denoted by (x) can be transferred from a bulk store into the shift register. At the end of the transfer operation, the data codes input are in the revision zone. Upon detection of those control codes defining an output zone, data codes can be transferred from the shift register to a bulk store.

With the above arrangement, input, output, and revision operations can be performed during each memory revolution as the control codes are detected in the data flow.

While the invention has been particularly shown and described with reference to several embodiments, it will be understood by those skilled in the art that various changes in form and detail may be made without departing from the spirit and scope of the invention.

What is claimed is:

1. An input/output system for arranging control codes to define sections and zones in a recirculating electronic shift register memory, and performing multiple operations after said control codes have been arranged, said system including a bulk store, a keyboard, and a printer and comprising in combination:
   (I) writing means connected to said memory and including a) a buss along which data codes are applied to and from said keyboard, printer, and bulk store, b) register and gating means for inserting and writing data and control codes into, deleting data and control codes from, and reading data and control codes out of, said memory, and c) a plurality of control lines along which logical signals are applied when data and control codes are to be gated through said gating means;
   (II) decode means connected to said memory for decoding control codes in said memory upon each revolution thereof in said memory; and
   (III) control means including logical circuitry connected to said decode means and said control lines of said writing means for applying logical signals to said control lines to cause said writing means to initially randomly write a first control code into said memory for defining a normal section, an alternate section, and an expandable input zone in said alternate section, and to write a second control code into said memory adjacent said first control code for defining an expandable revision zone in said normal section; said control means further including means for applying logical signals to said control lines dependent upon the particular operations to be performed and dependent upon said decoding of said control codes by said decode means; said control means further including:
      (1) means for performing an input operation wherein a number of data codes and a new first control code are written, by said writing means, into said input zone and over at least said first control code in said memory after said first control code has been decoded by said decode means; wherein said zones and sections are redefined through writing said new first control code into said memory following the last of said data codes written into said memory;
      (2) means for performing a revision operation wherein a number of data codes are inserted and written into, and deleted from, said revision zone, by said writing means, after said second control code has been decoded by said decode means; and (3) means for performing an output operation wherein data codes are read out of said revision zone by said writing means after said second control code has been decoded by said decode means; said control means further including means for performing at least two of said input, output, and revision operations during a revolution of said first control code in said memory.

2. A system according to claim 1 wherein said control means includes means for defining an output zone in said normal section through causing said writing means to insert a third control code into said normal section after said second control code has been decoded by said decode means.

3. A system according to claim 2 wherein said control means includes means for defining an operating point in said normal section through causing said writing means to insert a fourth control code into said normal section after said second control code has been decoded by said decode means.

4. A system according to claim 3 wherein said control means includes means for defining a holding point in said alternate section through causing said writing means to insert a fifth control code into said alternate section after said first control code has been decoded by said decode means.

5. A system according to claim 4 wherein said control means includes means for interrupting said system in order that only one of said operations can be performed during said revolution.

6. In an input/output system having a recirculating electronic shift register memory for storing data and control codes; a keyboard; a printer; a bulk store; writing means connected to said memory and including *a*) a buss along which said data codes are applied to and from said keyboard, printer, and bulk store, *b*) register and gating means for inserting and writing data and control codes into, deleting data and control codes from, and reading data and control codes out of, said memory, and *c*) a plurality of control lines along which logical signals are applied when said data and control codes are to be gated through said gating means; decode means connected to said memory for decoding control codes in said memory upon each revolution thereof in said memory; and control means including logical circuitry connected to said decode means and said control lines of said writing means for applying logical signals to said control lines and causing said writing means to initially randomly write a first control code into said memory for defining a normal section, an alternate section, and an expandable input zone in said alternate section; the improvement comprising:

(A) means included in said control means for applying logical signals to said control lines to cause said writing means to write a second control code into said memory adjacent said first control code for defining an expandable revision zone in said normal section; and (B) means included in said control means for performing multiple operations by applying logical signals to said control lines dependent upon said decoding of said control codes by said decode means and the particular operations to be performed; said means included in said control means including:

(1) means for performing an input operation wherein a number of data codes are written, by said writing means, into said input zone and over said first control code and following codes in said memory after said first control code has been decoded by said decode means; and wherein said zones and sections are redefined through writing a new first control code into said memory following the last of said data codes written into said memory;

(2) means for performing a revision operation wherein a number of data codes are inserted into, written into, or deleted from, said revision zone, by said writing means, after said second control code has been decoded by said decode means; and (3) means for performing an output operation wherein a number of data codes are read out of said revision zone by said writing means after said second control code has been decoded by said decode means; said control means further including means for performing at least two of said input, output, and revision operations during a revolution of said first control code in said memory.

* * * * *